United States Patent
Malhotra

(10) Patent No.: US 6,388,989 B1
(45) Date of Patent: *May 14, 2002

(54) METHOD AND APPARATUS FOR PREVENTING MEMORY OVERRUN IN A DATA TRANSMISSION SYSTEM

(75) Inventor: Pankaj Malhotra, Sunnyvale, CA (US)

(73) Assignee: Cisco Technology, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,087

(22) Filed: Jun. 29, 1998

(51) Int. Cl.$^7$ ................................ H04J 3/06; H04L 1/00
(52) U.S. Cl. ..................... 370/229; 370/466; 370/503; 710/25; 710/52; 710/56; 710/58; 710/260; 711/100; 711/111; 711/147
(58) Field of Search ............................ 710/22, 23, 25, 710/28, 52, 53, 54, 55, 56, 57, 260, 266, 58; 711/100, 111, 104, 117, 147; 370/229, 236, 389, 466, 469, 498, 503

(56) References Cited

U.S. PATENT DOCUMENTS

| | | | | |
|---|---|---|---|---|
| 4,599,689 A | * | 7/1986 | Berman | 364/200 |
| 4,680,699 A | * | 7/1987 | Uchino | 364/200 |
| 5,179,663 A | * | 1/1993 | Iimura | 395/250 |
| 5,291,479 A | * | 3/1994 | Vaziri et al. | 370/58.2 |
| 5,333,271 A | * | 7/1994 | Fredericks et al. | 395/200 |
| 5,369,751 A | * | 11/1994 | Kambayashi et al. | 395/425 |
| 5,448,702 A | * | 9/1995 | Garcia, Jr. et al. | 395/325 |
| 5,475,859 A | * | 12/1995 | Kamabayashi et al. | 395/825 |
| 5,687,392 A | * | 11/1997 | Radko | 395/842 |
| 5,768,445 A | * | 6/1998 | Troeller et al. | 382/305 |
| 5,784,592 A | * | 7/1998 | Gulick et al. | 395/500 |
| 5,784,650 A | * | 7/1998 | Gulick et al. | 396/882 |
| 5,784,698 A | * | 7/1998 | Brady et al. | 711/171 |
| 5,812,800 A | * | 9/1998 | Gulick et al. | 395/308 |
| 5,818,609 A | * | 10/1998 | Yamamuro | 358/468 |
| 5,930,829 A | * | 7/1999 | Little | 711/170 |
| 5,964,843 A | * | 10/1999 | Eisler et al. | 709/300 |

* cited by examiner

Primary Examiner—Hassan Kizou
Assistant Examiner—Joe Logsdon
(74) Attorney, Agent, or Firm—Marger Johnson & McCollom, PC

(57) ABSTRACT

Provided is a method for preventing memory overrun in a data transmission system. The data transmission system includes a CPU, an HDLC controller having a receive buffer, and a memory shared between the CPU and the HDLC controller. The method includes initializing the HDLC controller by writing to the shared memory. The CPU terminates data reception at the HDLC controller by sending a data reception termination instruction to the controller. The CPU receives an acknowledgement instruction from the HDLC controller responsive to sending the data reception termination instruction. The CPU creates an empty buffer in the shared memory responsive to receiving the acknowledgement instruction from the controller. Thereafter, the CPU makes receive descriptors included in the shared memory point to the empty buffer. The HDLC controller subsequently transfers the data contained in its receive buffer to the empty buffer in shared memory.

19 Claims, 6 Drawing Sheets

METHOD AND APPARATUS FOR PREVENTING MEMORY OVERRUN IN A DATA TRANSMISSION SYSTEM

BACKGROUND OF THE INVENTION

1. Field of the Invention

The present invention relates to a data transmission system controller, and more particularly, to a method and apparatus for preventing memory overrun in a data transmission system using a High Level Data Link Control (HDLC) protocol.

2. Description of the Prior Art

The HDLC protocol is Data Link (Layer 2) protocol for establishing a reliable communication link between a source and a destination. The HDLC protocol is based on a sliding window protocol and uses different data frames to handle connection, termination, and exchange of user data and link control. HDLC frames each include an address that must be processed independently of the addresses for other HDLC frames. HDLC controllers, receive, parse, interpret, and respond to messages transmitted in the HDLC format. The HDLC controller, together with a central processing unit and a shared memory, format and de-format the flag, bit stuff, and checksum bits for the HDLC frames.

One type of HDLC controller is the MUNICH32 manufactured by Siemens® corporation. The MUNICH32 can handle up to 32 1.536/1.544 Mbits/second T1/DS1 channels, 32 2.048 Mbits/second CEPT channels, or 4.096 Mbits/second 32-channel Pulse Code Modulation (PCM) bus. The PCM bus is the actual physical media used to transport digital signals, e.g., DS1, DS2, DS3, etc. The HDLC controller processes HDLC frames at bit rates from 8 Kbits/second up to 2.048 Mbits/second. A 64-channel Direct Memory. Access (DMA) controller exchanges data and channel control information between the MUNICH32 and the shared memory. The MUNICH32 and other types of HDLC controllers are well known to those skilled in the art and are therefore not explained in further detail.

A block diagram of a data transmission system 10 is shown in FIG. 1. The data transmission system 10 includes an HDLC controller 12, a central processing unit (CPU) 18, and a memory 20. The HDLC controller 12 transfers HDLC frames between a PCM bus 24 and the memory 20 using a 32-bit system bus 22. The memory 20 is a Random Access Memory (RAM) shared between the HDLC controller 12 and the CPU 18 through the system bus 22. The HDLC controller 12 includes a receive buffer 14. The receive buffer 14 is a 256-byte first-in-first-out (FIFO) buffer that can buffer 8 complete HDLC frames before transferring the buffered data into the shared memory 20. Although a single HDLC controller 12 is shown in FIG. 1, each time slot can be shared between up to four HDLC controllers using sub-channeling. Thus, four controllers can handle four different D-channels in one single time slot.

The CPU 18 and the HDLC controller 12 communicate with each other primarily through the shared memory 20. At start up, the CPU 18 initializes the controller 12 by creating a valid data buffer 42. (shown in FIGS. 3A–4E) and writing configuration information required by the HDLC controller 12 into the shared memory 20. The HDLC controller 12 reads the configuration information from the shared memory 20 and transfers data stored in the receive buffer 14 to the valid buffer 42.

The division of shared memory 20 for the MUNICH32 HDLC controller 12 is shown in FIG. 2. The HDLC controller 12 requires that the shared memory 20 include a programmable configuration start address 30, a control and configuration section (CCS) 32, and a variable size interrupt circular queue 34. The HDLC controller 12 also includes receive descriptors 36, receive data section 37, transmit descriptors 38, and transmit data section 39 for each channel. The shared memory 20 allocated for each transmit and receive channel is organized as a chained list of buffers 42. Each chained list of buffers 42 is composed of the receive and transmit descriptors 36 and 38, respectively, and the receive and transmit data sections 37 and 39, respectively. The receive descriptors 36 and the transmit descriptors 38 each contain a pointer to the next descriptor, a start address, and an address to a corresponding data section 37 or 39. The descriptors 36 and 38 also include control information, e.g., a frame end indication, transmission hold, and rate adaption with interface time fill.

Since the HDLC controller 12 (FIG. 1) has no internal programmable or pollable registers, commands from the CPU 18 are transmitted to the HDLC controller 12 by updating the CCS section 32 of the memory 20. The CPU 18 then issues an Action Request (AR) instruction to the HDLC controller 12. The controller 12 responds back with an Action Acknowledge (ARACK) instruction or a Failure-To-Do-The-Operation (ARF) instruction. HDLC controllers 12, like the MUNICH32 controller, prohibit an AR instruction during the time a preceding instruction has not been acknowledged by an ARACK or an ARF instruction or when a pulse signal is present at the RESET pin (not shown).

In order to stop the HDLC controller 12 from receiving data from the PCM bus 24, the CPU 18 sends a first set of instructions to the controller 12. This first set of instructions includes a Receive Abort (RA) instruction followed by a Receive Off (RO) instruction. The HDLC controller 12 responds back to the CPU 18 with an ARACK or an ARF for each of the instructions, indicating that the HDLC controller 12 is no longer receiving data from the PCM bus 24. A problem with HDLC controllers 12 such as the MUNICH32 controller is that even though data reception at the controller 12 is terminated, the transfer of data from the receive buffer 14 to buffers 42 in memory 20 continues. Thus, the HDLC controller 12 may inadvertently write over or corrupt pre-existing data or unprocessed data in buffers 42.

FIGS. 3A–3C are block diagrams showing the memory overrun problem in the data transmission system 10. In FIG. 3A, the CPU 18 first sends an RA instruction followed by an RO instruction to the HDLC controller 12 for terminating data reception. Under normal operating conditions in FIG. 3B, the HDLC controller 12 responds with an ARACK instruction for each sent RA and RO instruction. At this point, the HDLC controller 12 in FIG. 3C no longer receives data from the PCM bus 24. Although no longer receiving data, the HDLC controller 12 continues to transfer the data contained in its receive buffer 14 to the buffer 42 in shared memory 20. The buffer 42 may contain data 44 that might be overwritten as the HDLC controller 12 continues to transfer data from receive buffer 14 to buffer 42. After the CPU 18 receives acknowledgement of data termination from the controller 12, i.e., an ARACK or ARF instruction, the CPU 18 terminates buffer 42, releasing the memory space for use by another controller 12 or subsystem (not shown). Thus, the HDLC controller 12 may inadvertently write over valid data in a newly created buffer used by another controller 12 or subsystem or may write past the end of the buffer 42 in memory 20 with the data in receive buffer 14.

Accordingly, a need remains for a method and apparatus for preventing memory overrun or corruption in a data transmission system controllers.

SUMMARY OF THE INVENTION

The present invention concerns a method and apparatus for preventing memory overrun in a data transmission system. The data transmission system includes a CPU, an HDLC controller having a receive buffer, and a memory shared between the CPU and the HDLC controller. A particular embodiment of the invention includes descriptor registers created in the shared memory by the CPU for use by the HDLC controller. A data reception termination instruction is sent from the processor to the HDLC controller to terminate data reception by the HDLC controller from the PCM bus. The HDLC controller generates and sends an acknowledgement instruction to the processor responsive to the data reception termination instruction.

Thereafter, the CPU creates an empty memory buffer in the shared memory responsive to receiving the acknowledgement instruction and makes the descriptor registers in the shared memory point to the empty memory buffer. By doing so, data transfers from the HDLC controller 12 to the memory 20 occurring after the processor has terminated data reception are written into the empty memory. Since the empty memory buffer does not contain valid data, the HDLC controller cannot overwrite or corrupt existing data by appending onto an existing data buffer or by writing over a descriptor that might contain unprocessed data.

The foregoing and other objects, features and advantages of the invention will become more readily apparent from the following detailed description of a preferred embodiment that proceeds with reference to the drawings.

DETAILED DESCRIPTION OF THE PREFERRED EMBODIMENT

FIGS. 4A–4E are block diagrams showing how to prevent the memory overrun problem according to the present invention. For simplicity, the problem addressed by the method and apparatus of the present invention will be described with reference to the MUNICH32 HDLC controller manufactured by Siemens® corporation. However, the method and apparatus of the present invention is not limited to data systems incorporating the MUNICH32 HDLC controller. Rather, the present invention is applicable to any data transmission systems that can possibly write over valid data in memory in a similar manner as the MUNICH32 HDLC controller.

Figure 4A:
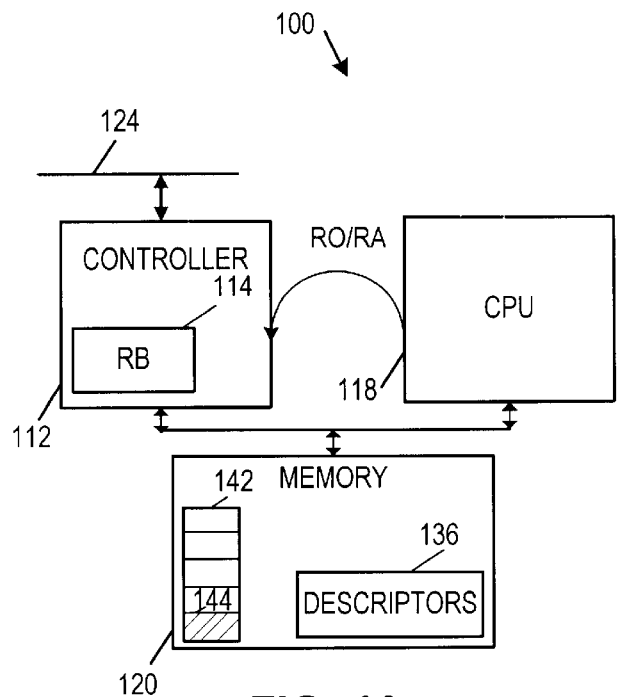
FIGS. 4A–4E are block diagrams showing how memory overrun is prevented according to the present invention.
Figure 4B:
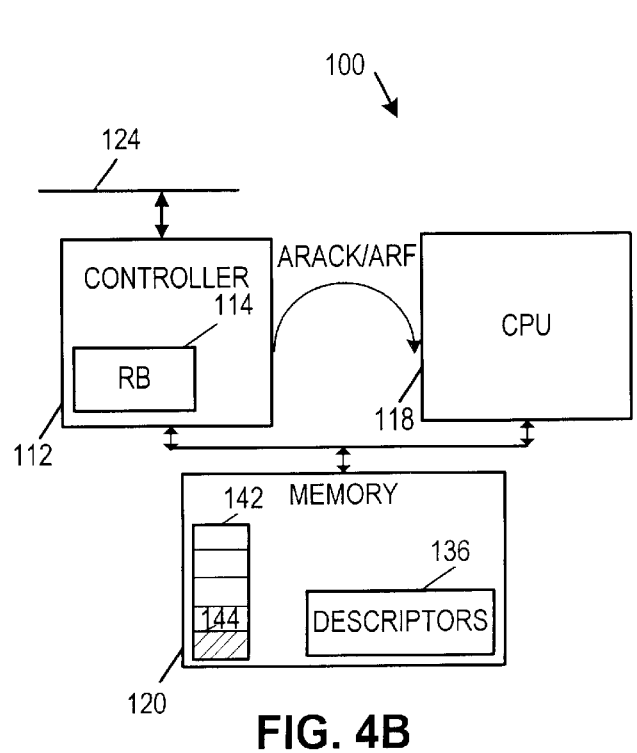

As explained above, the CPU 118 controls data reception termination by the HDLC controller 112 by sending data reception termination instructions in FIG. 4A. The data reception termination instructions for the HDLC controller 100 are an RA instruction followed by an RO instruction. The HDLC controller 112 acknowledges each of these instructions with an acknowledgement instruction in FIG. 4B. For the HDLC controller 112, the acknowledgement instructions are an ARACK or an ARF instruction for each of the data reception termination instructions depending on whether the operation was completed successfully.

Figure 1:
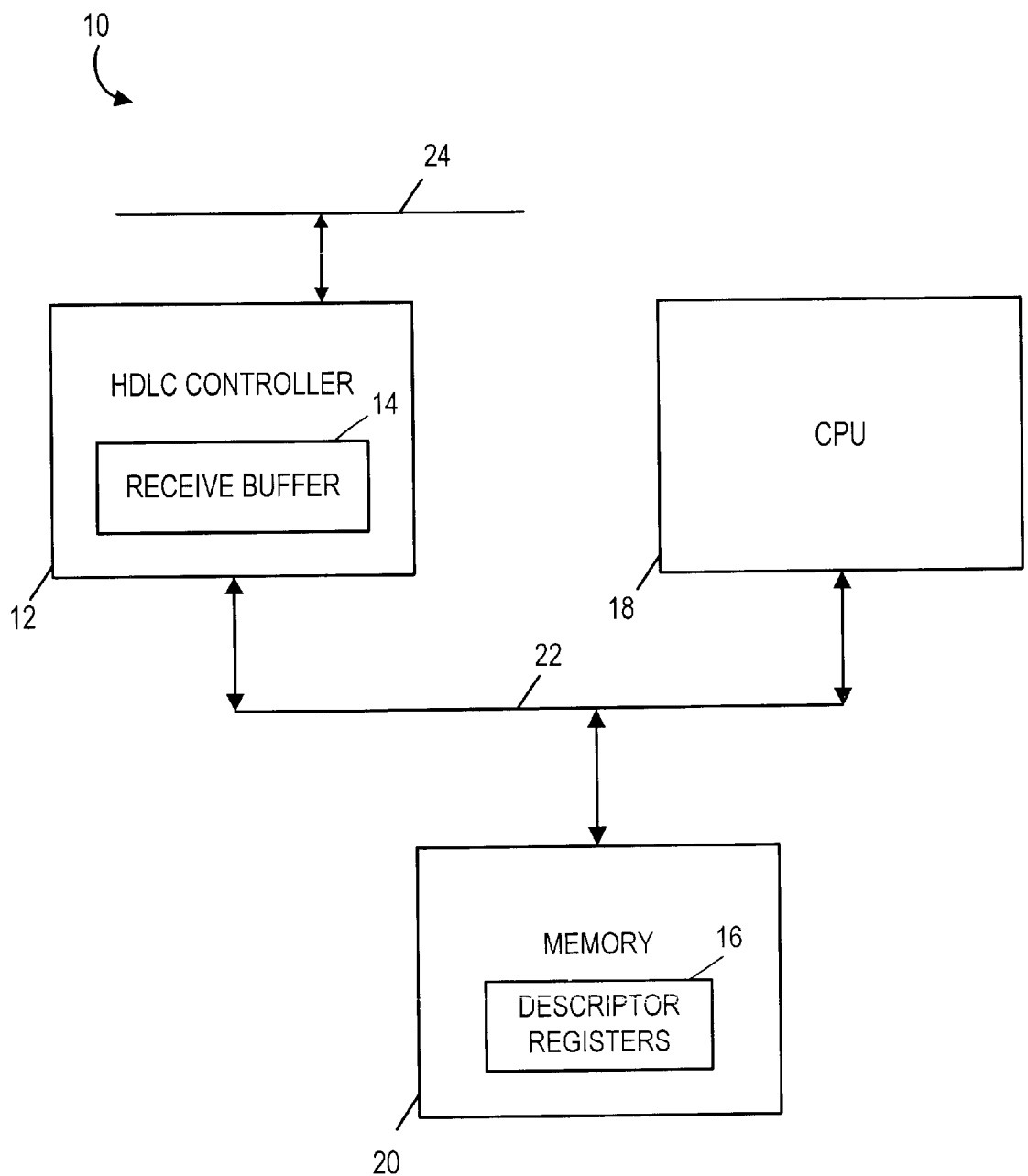
FIG. 1 is a block diagram of an HDLC data transmission system including an HDLC controller.
Figure 2:
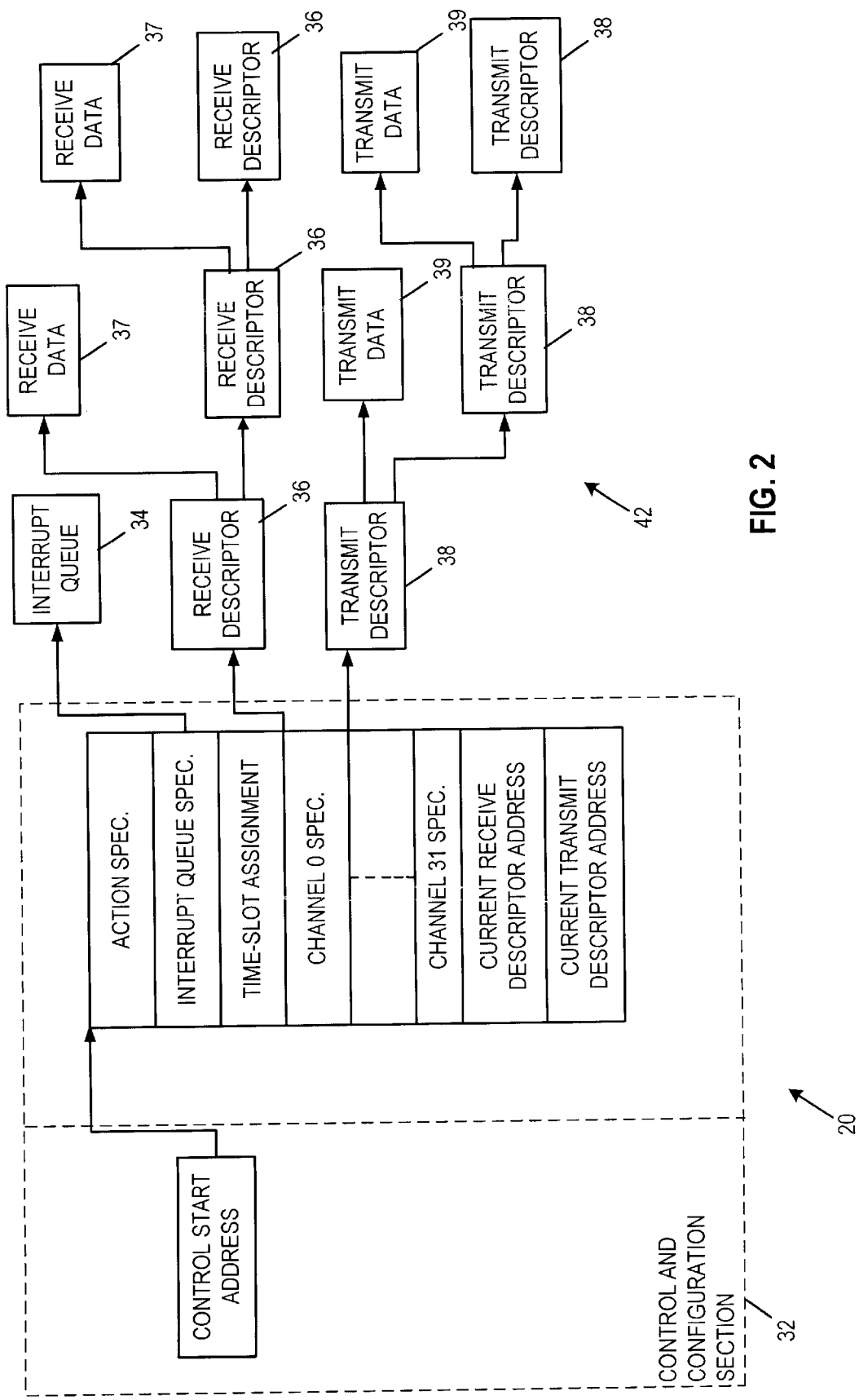
FIG. 2 is a block diagram of the memory division of the shared memory 20 shown in FIG. 1.
Figure 3A:
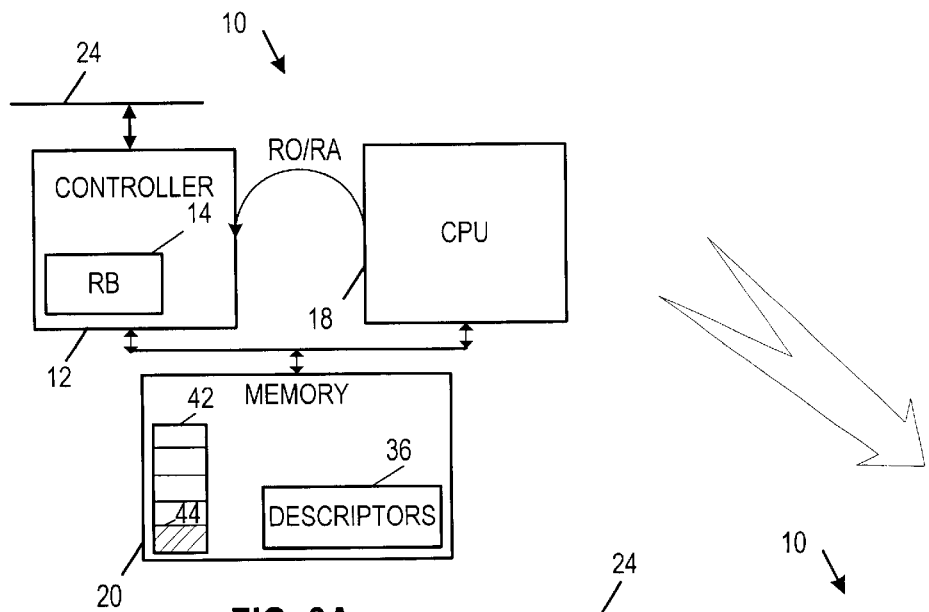
FIGS. 3A–3C are block diagrams showing a memory overrun problem in the data transmission system 10 shown in FIG. 1.
Figure 3B:
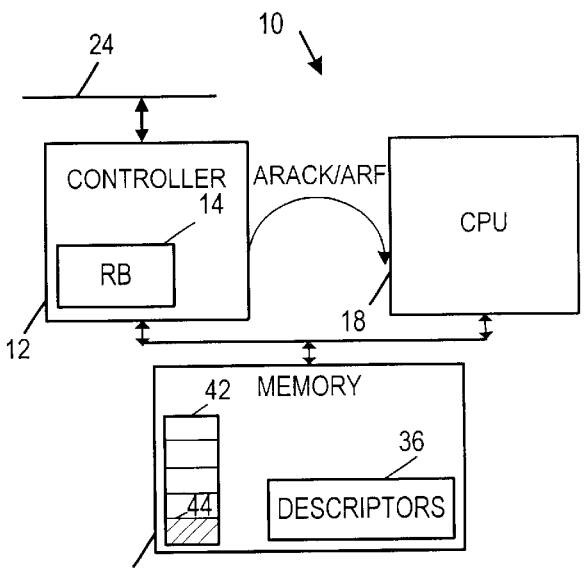
Figure 3C:
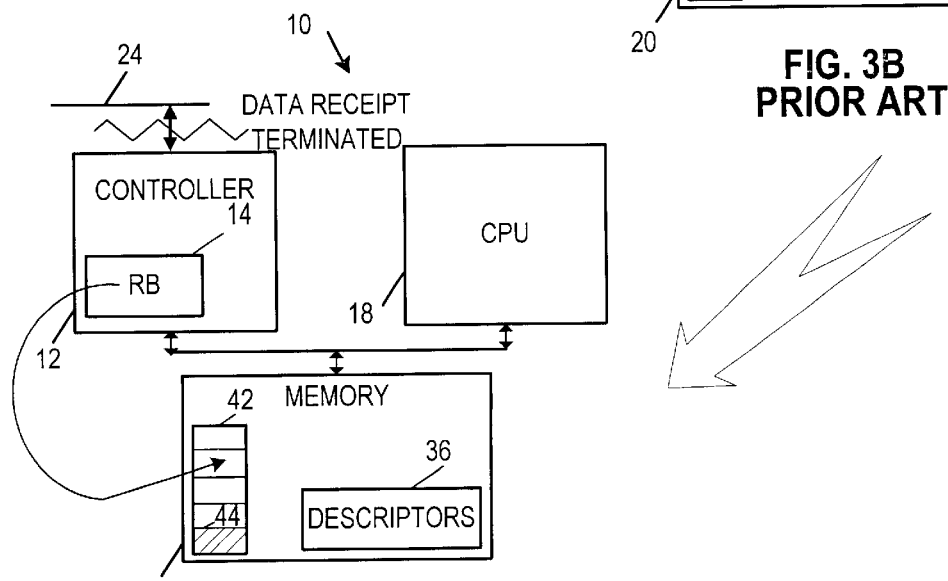
Figure 4C:
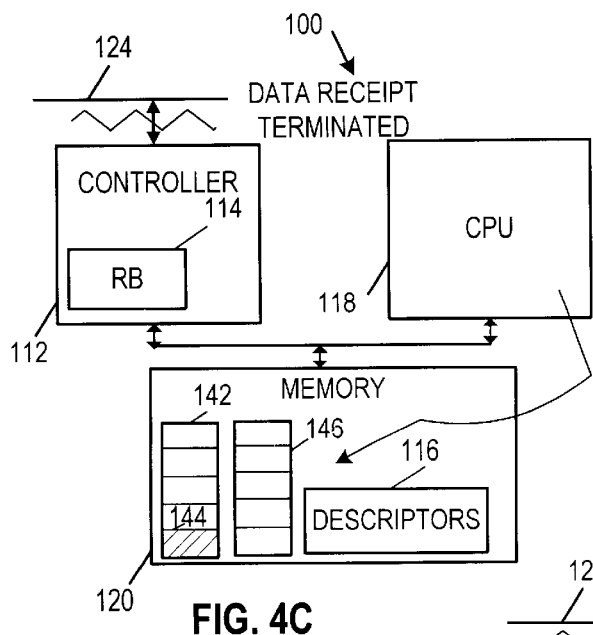
Figure 4D:
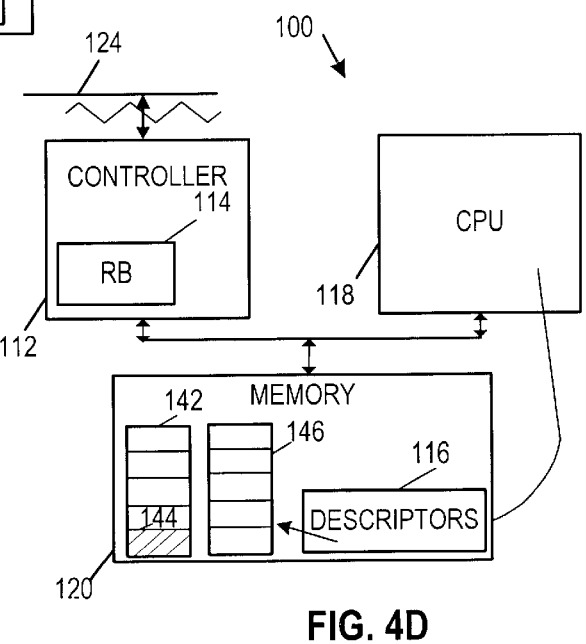
Figure 4E:
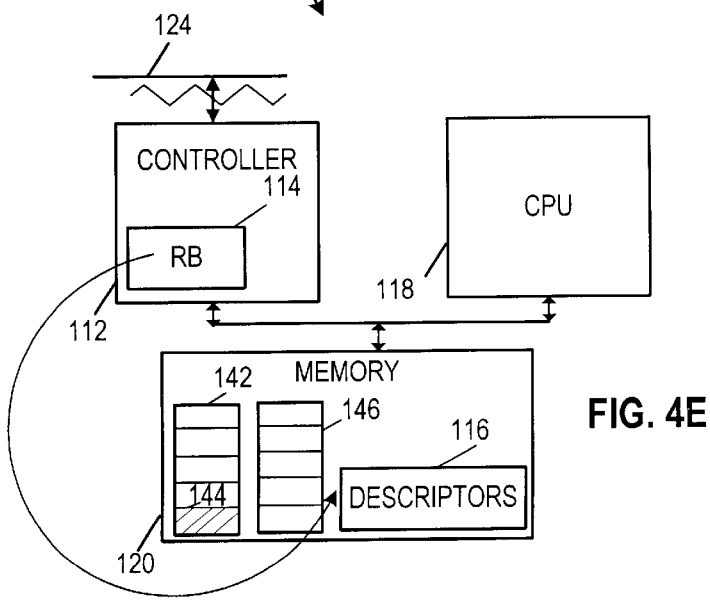

After sending and receiving acknowledgment of the data reception termination instructions, the CPU 18 creates an empty buffer 46 in the shared memory 20 in FIG. 4C. The empty buffer 46 is of substantially equal size to the receive buffer 14 to ensure that the entire contents of the receive buffer 14 are capable of being transferred to the empty buffer 46 without writing over valid or preexisting data 44. The CPU 18 then changes the values of the receive descriptors 36 in the shared memory 20 to point to the empty buffer 46 (shown in FIG. 4D). By doing so, the memory overrun problem described above with reference to FIGS. 3A–3C is avoided. Even though the RDLC controller 12 may continue to transfer the contents of its receive buffer 14 to die shared memory 20, the controller 12 is no longer transferring its data to valid buffers 42 having valid preexisting data 44. Rather, the HDLC controller 12 transfers the contents of its receive buffer 14 to empty buffer 46 as shown in FIG. 4E.

Figure 5:
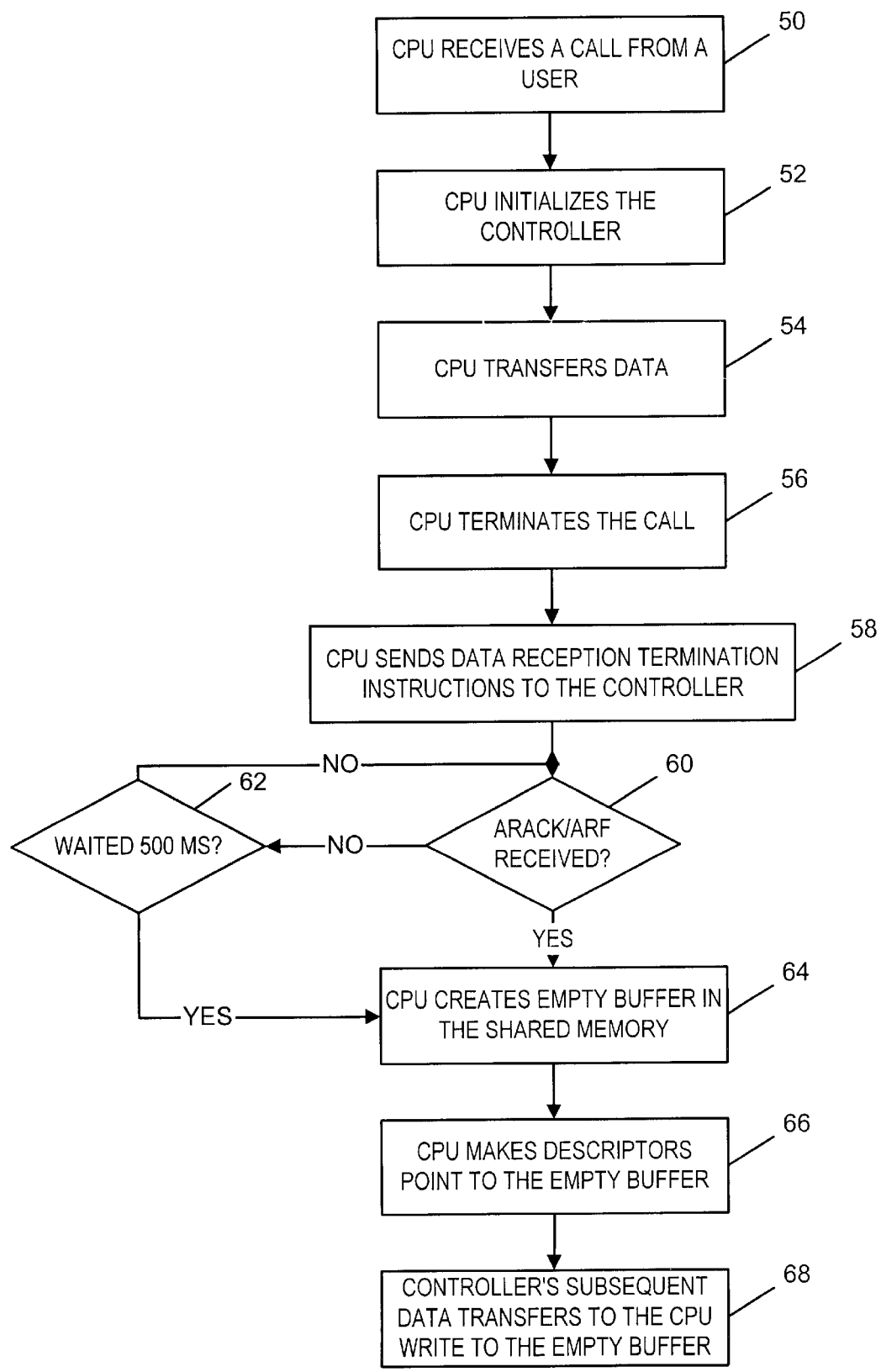
FIG. 5 is a flowchart of the method for preventing the memory overrun problem of the present invention.

The method for preventing memory overrun in the HDLC data transmission system 100 will be described in detail with reference to FIG. 5. At step 50, the CPU 118 receives a call from a user (not shown) on a data transmission line (not shown) such as an ISDN line. The CPU 118 identifies the call as a data call and sets up a communication channel between one of the channels of the HDLC controller 1 12 and the user. At this point, the call now has two ends. The user is at the first end connected to the data transmission system 100 by, for example, a Telco ISDN switch. The CPU 118 and HDLC controller are at the second end. At step 52, the CPU 118 initializes the HDLC controller 1 12 by sending configuration data to the shared memory 120. During initialization, the CPU 118 creates a valid buffer 142 and sets the operating mode for the HDLC controller 112 including the bit rate adaption method, the time slot allocation configuration, etc. At step 54, data is transferred between the CPU 118 and the user through the HDLC controller 112. The transferred data is, for example, email, Internet traffic, or the like. The user at the first end terminates the call to the CPU 118 by sending a CALL DISCONNECT instruction. The CPU 118, in turn, drops the call (step 56).

At step 58, the CPU 118 terminates data reception by the HDLC controller 112 by sending the HDLC controller 112 data reception termination instructions such as an RA instruction followed by an RO instruction as described above. Under normal operating conditions, the HDLC controller 112 responds to each of these instructions by sending an acknowledge instruction, e.g., either an ARACK or an ARF instruction. At step 60, the CPU 118 determines whether the HDLC controller 112 has acknowledged each of the data reception termination instructions. The CPU 118 waits a predetermined amount of time, e.g., 500 milliseconds, for the acknowledgement from the HDLC controller 112. If the controller 112 has not acknowledged the data reception termination instructions within the predetermined amount of time in step 62, the CPU 118 considers the HDLC controller 112 to be in an unknown state and proceeds to create an empty buffer 146 at step 164.

After either receiving an acknowledge instruction for each data reception termination instruction or waiting the predetermined amount of time, the CPU 118 in step 64 creates an empty buffer 146 in shared memory 120. The empty buffer 146 is of substantially equal size to the receive buffer 114 in the HDLC controller. At step 66, the CPU 118 changes the pointer values for the receive descriptors in the shared memory 120 to point to the newlycreated empty buffer 146. By doing so, subsequent data transfers from the receive buffer 114 in the HDLC controller 112 to the shared memory 120 write to the empty buffer 146. Since the empty buffer 146 contains no valid data, the HDLC controller 112 cannot overwrite existing valid data 144 by appending the existing data buffer 142 or by writing to a buffer pointed to by the next descriptor that might contain unprocessed data. When a subsequent user makes a call to the CPU 118, the process begins anew by the CPU 118 reinitializing the controller 112 to receive and process the data for the new call.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A method for preventing memory overrun in a packet based data transmission system including a memory shared between an HDLC controller and a processor, the HDLC controller including a receive buffer for buffering data received from a pulse code modulation (PCM) data bus, the method comprising:
    receiving a call from a user;
    initializing a communication channel between the user, the processor, and the HDLC controller;
    creating descriptor registers in the shared memory for use by the HDLC controller;
    creating a first buffer in the memory responsive to the initializing;
    transferring data from the receive buffer in the HDLC controller to the first buffer, the data being received from the PCM bus;
    sending a data reception termination instruction from the processor to the HDLC controller;
    receiving an acknowledgement instruction at the processor responsive to sending the data reception termination instruction;
    creating a second buffer in the shared memory responsive to receiving the acknowledgement instruction;
    making the descriptor registers in the shared memory point to the second memory buffer; and
    transferring data from the receive buffer in the HDLC controller to the second memory buffer after data reception at the controller is terminated.

2. The method for preventing memory overrun according to claim 1 wherein sending the data reception termination instruction includes:
    sending a receive abort instruction; and
    sending a receive off instruction.

3. The method for preventing memory overrun according to claim 1 wherein receiving the acknowledgement instruction includes receiving an action request acknowledge instruction.

4. The method for preventing memory overrun according to claim 1 wherein receiving the acknowledgement instruction includes receiving a notification of a failure to do the operation instruction.

5. The method for preventing memory overrun according to claim 1 wherein creating the second buffer in the shared memory includes creating second buffer of substantially equal size than the receive buffer in the HDLC controller.

6. The method for preventing memory overrun according to claim 1 wherein instead of receiving the acknowledgement instruction the method includes waiting a predetermined amount of time responsive to sending the data reception termination instruction.

7. A The method for preventing memory overrun according to claim 6 wherein waiting a predetermined amount of time includes waiting 500 milliseconds.

8. A method for preventing memory overrun in a packet based data transmission system including a high level data link control (HDLC) controller having a receive buffer, a processor, and a random access memory (RAM) shared by the HDLC controller and the processor, the method comprising:
    initializing a communication channel between the HDLC controller and a user through a PCM bus;
    transferring data from the user to the receive buffer and from the receive buffer to a first buffer in RAM;
    receiving a set of reception termination instructions at the HDLC controller;
    sending an acknowledge instruction to the processor for each reception termination instruction received by the HDLC controller;
    terminating data reception between the HDLC controller and the user; and
    transferring data to a second buffer created in the RAM responsive to receiving acknowledge instruction after terminating data reception between the HDLC controller and the user.

9. The method for preventing memory overrun according to claim 8 wherein the second buffer has a size substantially equal to the receive buffer in the HDLC controller.

10. The method for preventing memory overrun according to claim 8 wherein transferring data to the second buffer includes waiting a predetermined amount of time before beginning transferring data to the second buffer.

11. The method for preventing memory overrun according to claim 10 wherein the HDLC controller is a MUNICH32 HDLC controller and wherein the set of reception termination instructions includes a receive abort (RA) instruction followed by a receive off (RO) instruction, and the acknowledge instruction is either an action request acknowledge (ARACK) or a failure to do the operation instruction (ARF).

12. A packet based data transmission system, comprising:
    a memory having a first buffer and a plurality of descriptor registers;
    an interface device coupled to the memory and adapted to receive packetized data from a user through a pulse code modulation bus, and transfer the packetized data from a receive buffer in the interface device to the first buffer; and
    a central processing unit (CPU) coupled to the memory and the interface device adapted to terminate data reception at the interface device, to receive data reception termination acknowledgement from the interface device, to create a second buffer in the memory responsive to receiving the data reception termination acknowledgement, and to make the plurality of descriptor registers in the memory point to the second memory buffer such that transfers of packetized data from the interface device to the memory occurring after the termination of data reception write to the second buffer.

13. The data transmission system according to claim 12 wherein the interface device is a MUNICH32 HDLC controller.

14. The data transmission system according to claim 12 wherein the memory is a random access memory device.

15. The data transmission system according to claim 12 wherein the CPU generates a data reception termination instruction and sends the data reception termination instruction to the interface device and wherein the interface device generates an acknowledgement instruction and sends the acknowledgement instruction to the CPU responsive to the data reception termination instruction.

16. The data transmission system according to claim 12 wherein the second buffer has a size substantially equal to a size of the receive buffer in the interface device.

17. The data transmission system according to claim 12 wherein the CPU is adapted to create the second buffer a predetermined amount of time after terminating data reception at the interface device regardless of having received the data reception termination acknowledgement from the interface device.

18. The data transmission system according to claim 17 wherein the predetermined amount of time is equal to 500 milliseconds.

19. The data transmission system according to claim 12 wherein the CPU makes a plurality of receive descriptors in the interface device point to the second buffer after creating the memory buffer.

* * * * *

UNITED STATES PATENT AND TRADEMARK OFFICE
CERTIFICATE OF CORRECTION

PATENT NO. : 6,388,989 B1
DATED : May 14, 2002
INVENTOR(S) : Malhotra

It is certified that error appears in the above-identified patent and that said Letters Patent is hereby corrected as shown below:

Column 1,
Line 35, "Memory. Access" should read -- Memory Access --.

Column 4,
Line 15, "RDLC" should read -- HDLC --.
Line 16, "to die shared" should read -- to the shared --.
Lines 28 and 33, "controller 1 12" should read -- controller 112 --.

Column 5,
Line 1, "newlycreated" should read -- newly-created --.

Signed and Sealed this

Nineteenth Day of November, 2002

Attest:

Attesting Officer

JAMES E. ROGAN
*Director of the United States Patent and Trademark Office*